United States Patent [19]

Schwartz et al.

[11] Patent Number: 5,145,997
[45] Date of Patent: Sep. 8, 1992

[54] POLY (ALKYLENE OXIDE) SUBSTITUTED ACETOACETANILIDES

[75] Inventors: Russell J. Schwartz, Cincinnati; Anthony C. Zwirgzdas, Butler; Terence R. Chamberlain, Cincinnati, all of Ohio

[73] Assignee: Sun Chemical Corporation, Fort Lee, N.J.

[21] Appl. No.: 654,163

[22] Filed: Feb. 12, 1991

[51] Int. Cl.$^5$ ............... C07C 235/84; C07C 311/37
[52] U.S. Cl. .................... 564/158; 534/561; 560/20; 560/21; 560/142; 564/82; 564/86; 564/153; 564/200
[58] Field of Search ............ 564/153, 158, 82, 86, 564/200; 534/561; 560/21, 22, 142

[56] References Cited

U.S. PATENT DOCUMENTS 3,984,460 10/1976 Spivack .
4,118,382 10/1978 Jäger et al. ................. 260/154

Primary Examiner—Richard L. Raymond
Assistant Examiner—P. O'Sullivan
Attorney, Agent, or Firm—Jack Matalon

[57] ABSTRACT

Poly (alkylene oxide) substituted acetoacetanilides of the formula:

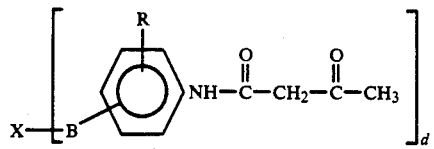

wherein B comprises a divalent bridging moiety selected from the group consisting of $C_1$-$C_6$ alkylene, —NHSO$_2$—, —O—, —CO—, —COO—, and —NCHO—; X comprises a poly (alkylene oxide) having a number average molecular weight of about 200 to 10,000; R comprises 0 to 4 moieties independently selected from the group consisting of $C_1$-$C_4$ alkyl, $C_1$-$C_4$ alkoxy and halogen; and d is an integer of 1 to 3. The poly (alkylene oxide) substituted acetoacetanilides are prepared by reacting a poly (alkylene oxide) monoamine, diamine or triamine with isatoic anhydride followed by acetoacetylation of the resultant aminobenzamide. The substituted acetoacetanilides are useful for preparing improved diarylide pigment compositions which in turn are useful for preparing storage stable printing inks (especially of the publication gravure type).

8 Claims, No Drawings

POLY (ALKYLENE OXIDE) SUBSTITUTED ACETOACETANILIDES

FIELD OF THE INVENTION

This invention relates to novel poly (alkylene oxide) substituted acetoacetanilides and to processes for preparing such acetoacetanilides. These acetoacetanilides have been found to be useful for preparing improved diarylide pigment compositions which in turn are useful for preparing storage stable printing inks (especially of the publication gravure type).

DESCRIPTION OF THE INVENTION

The present invention is directed to poly (alkylene oxide) substituted acetoacetanilides having the general formula:

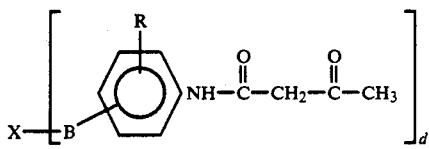

wherein B comprises a divalent bridging moiety selected from the group consisting of $C_1$–$C_6$ alkylene, —NHSO$_2$—, —O—, —COO—, and —NHCO—; X comprises a poly (alkylene oxide) having a number average molecular weight of about 200 to 10,000; R comprises 0 to 4 moieties independently selected from the group consisting of $C_1$–$C_4$ alkyl, $C_1$–$C_4$ alkoxy and halogen; and d is an integer of 1 to 3. Preferably, the poly (alkylene oxide) has a number average molecular weight of 1,000 to 3,000, R is equal to 0 moieties, d is an integer of 1, and B is —CONH—.

It is particularly preferred that the poly (alkylene oxide) be an ethylene oxide/propylene oxide copolymer, especially those copolymers embraced by the formula:

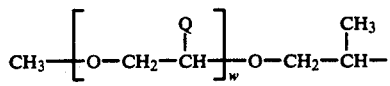

wherein Q is H or CH$_3$ and w is an integer of about 4 to 200, preferably 20 to 65.

The novel poly (alkylene oxide) substituted acetoacetanilides of the present invention can be readily prepared by the steps of:

Step A: reacting a poly (alkylene oxide) monoamine, poly (alkylene oxide) diamine or poly (alkylene oxide) triamine with a reactant comprising isatoic anhydride (at a temperature of 20° to 130° C.) so as to obtain the respective mono, bis, or tris aminobenzamide-terminated poly (alkylene oxide); and Step B: acetoacetylating the substituted aminobenzamide obtained in Step A with an acetoacetylation agent comprising diketene or t-butylacetoacetate so as to produce the poly (alkylene oxide) substituted acetoacetanilide.

The process for preparing the poly (alkylene oxide) substituted acetoacetanilide may be illustrated as follows:

Step A

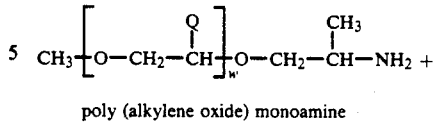

poly (alkylene oxide) monoamine

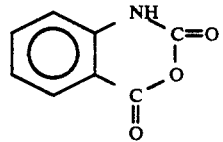

isatoic anhydride

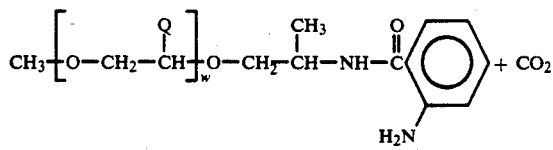

substituted monoaminobenzamide ("K")

Step B

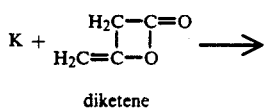

diketene

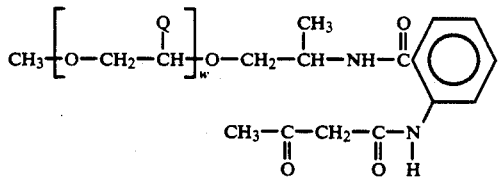

poly (alkylene oxide) substituted acetoacetanilide ("L")

Acetoacetylation (Step B) may also be performed using t-butylacetoacetate instead of diketene, as indicated below. Although the use of t-butylacetoacetate as the acetoacetylation agent leads to the production of t-butanol as a by-product, it is nevertheless preferred for manufacturing purposes since diketene is considered hazardous to transport and handle.

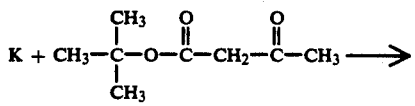

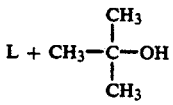

The poly (alkylene oxide) amines employed in Step A are well known and are commercially available, e.g. as Jeffamines ®, manufactured by Texaco Chemical Company. These amines contain a polyether backbone that is based either on propylene oxide ethylene oxide or mixed propylene oxide and ethylene oxide. The poly (alkylene oxide) monoamines are prepared by reaction of a monohydric alcohol, followed by conversion of the resulting terminal hydroxyl group to an amine. The poly (alkylene oxide) diamines are commercially available as several types, e.g. diamine-terminated polypropylene glycols, polyether diamines based on a predominantly polyethylene oxide backbone as well as urea condensates of such polyether diamines. Useful poly (alkylene oxide) triamines are those prepared by reaction of propylene oxide with a triol, followed by amination of the terminal hydroxyl groups. For the purposes of the present invention, the poly (alkylene oxide) monoamines are preferred. Further details of the preparation of poly (alkylene oxide) amines and their properties may be found in the Technical Service Bulletin published by the Texaco Chemical Company, entitled "The Jeffamine ® Polyoxyalkyleneamines".

The poly (alkylene oxide) substituted acetoacetanildes are useful for preparing diarylide pigments which exhibit excellent storage stability in aromatic solvent-based printing inks, e.g. publication gravure inks. The diarylide pigment may be of any of the know types derived from the well known reactions involving (1) tetrazotizing 3,3'-dichlorobenzidine or dianisidine with nitrous acid (which in turn is typically generated by the combination of sodium nitrite and hydrochloric acid) and (2) the coupling of the resultant tetrazonium salt with an acetoacetanilide. A typical diarylide pigment will have the following structure.

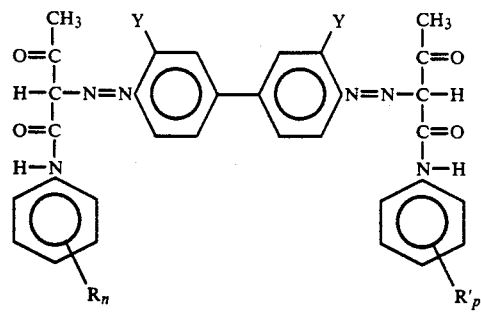

wherein R and R' are independently selected from the group consisting of $C_1$-$C_4$ alkyl, $C_1$-$C_4$ alkoxy and halogen; n and p are independently integers of 0 to 5; and Y is Cl, $CH_3$ or $OCH_3$. For the purposes of the present invention, the preferred pigments to be improved using the present poly (alkylene oxide) substituted acetoacetanilides are Pigment Yellow 12, Pigment Yellow 13, Pigment Yellow 14, Pigment Yellow 17, Pigment Yellow 83, Pigment 114, Pigment Yellow 126, Pigment Yellow 127, Pigment Yellow 176, and Pigment Orange 16. The following reactions are illustrative of the manner in which the poly (alkylene oxide) substituted acetoacetanilide corresponding to compound "L" may be employed to prepare an improved version of Pigment Yellow 12:

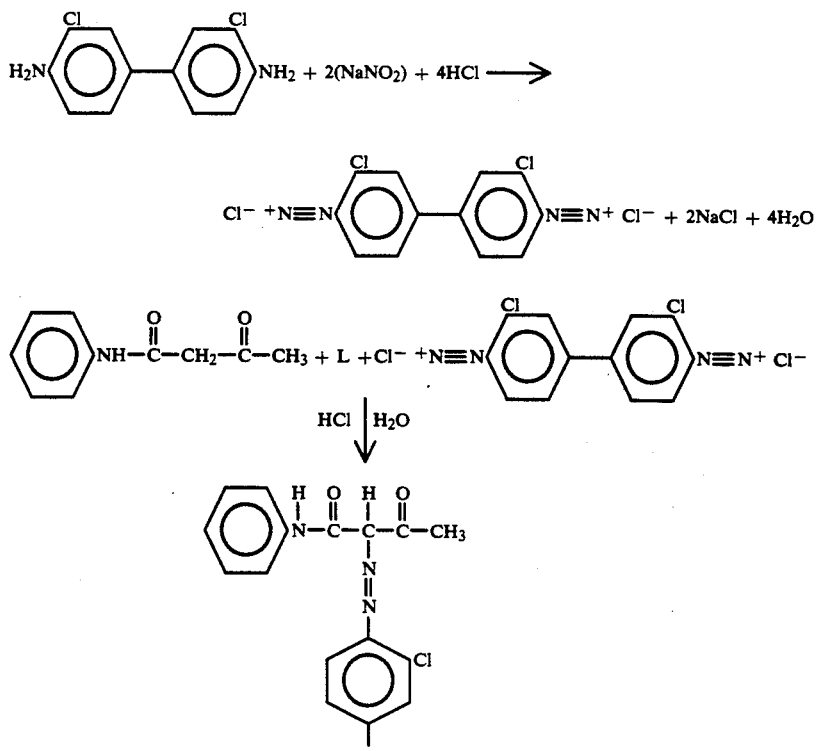

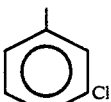
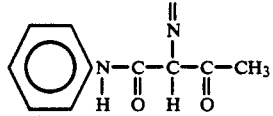

Pigment Yellow 12

Plus Compound "M" plus Compound "N" shown hereinbelow:

Compound "M"

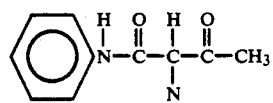
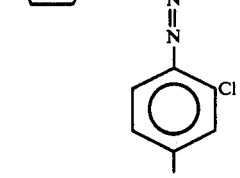
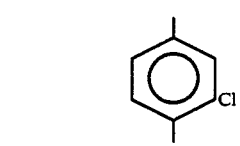
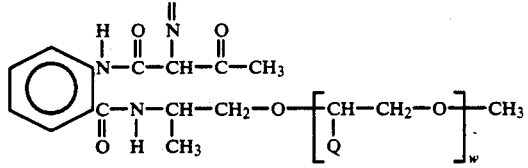

Compound "N"

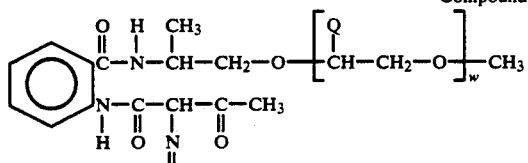
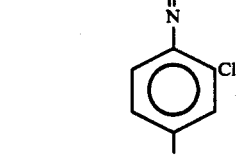
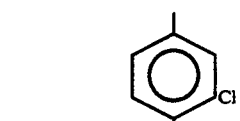
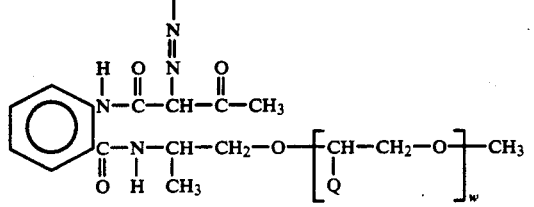

Publication gravure inks prepared from the improved diarylide pigments obtained by using the novel substituted acetoacetanilides of the present invention exhibit outstanding storage stability, showing no discernible changes in color shade, strength or rheology, even after prolonged storage at elevated temperatures (over 3 days at 50° C.). Furthermore, the elimination of malodorous amines from the formulations provides an improved manufacturing environment for both the pigment and ink producer.

The following nonlimiting examples serve to illustrate the poly (alkylene oxide) substituted acetoacetanilides and their method of preparation as well as their use in preparing improved diarylide pigments and storage stable publication gravure inks prepared from such improved diarylide pigments. Unless otherwise indicated, all parts and percentage are by weight.

EXAMPLE I

Agent A: A mixture of 16.5 parts of isatoic anhydride (96% pure) and 220 parts of a primary amine-terminated poly (ethylene oxide/propylene oxide) copolymer having a number average molecular weight of approximately 2,000 (sold and Jeffamine ® M 2070 by Texaco Chemical Corp.) was stirred and heated gradually to 80° C. until evolution of $CO_2$ ceased. The infrared spectrum indicated that the isatoic anhydride had completely reacted as evidenced by the disappearance of the characteristic anhydride absorptions at 1748 $cm^{-1}$ and 1787 $cm^{-1}$ and the appearance of an amide absorption at approximately 1640 $cm^{-1}$. Thereafter, 8.4 parts of diketene were added and stirring continued at 80° C. for about 1 hour until all the diketene had reacted as evidenced by the disappearance of its characteristic infrared absorptions at 1891 $cm^{-1}$ and 1860 $cm^{-1}$. The resulting reddish brown liquid was used in Example II to prepare an improved diarylide pigment composition.

Agent B: The procedure outlined above for the preparation of Agent A was repeated, except that 16.5 parts of t-butyl acetoacetate were substituted for the 8.4 parts of diketene. The reaction mass was then heated, with stirring, at 95° C. for 8 hours. The resulting material possessed an infrared spectrum similar to that of Agent A.

EXAMPLE II

Tetrazotized 3,3'-dichlorobenzidine ("DCB") was prepared by charging 21.7 parts of DCB to 39.8 parts of 20° Be hydrochloric acid and 140 parts of ice/water mixture with constant stirring to form a homogenous suspension. To the suspension were added 32.6 parts of a 38% solution of sodium nitrite and stirring was continued for 1 hour at a temperature of 0°-3° C. The excess nitrous acid was then destroyed by the addition of approximately 0.5 part sulfamic acid.

A fine suspension of coupler was prepared by charging 31.1 parts acetoacetanilide and 0.5 part phenylmethyl pyrazolone (a shading agent) to 400 parts water and 33.6 pats of 50% sodium hydroxide; the mixture was stirred until all solids were dissolved. The temperature of the resulting solution was adjusted to 0°-5° C. with the addition of ice and thereafter the coupler was precipitated by the slow addition of 36.2 parts of 70% acetic acid. Immediately prior to coupling, 20.0 parts of Agent A were added to the coupler suspension. Stirring was maintained throughout coupler preparation and the coupling reaction.

Coupling was then carried out by adding the solution of tetrazotized DCB to the fine suspension of coupler over a period of 40 minutes. Stirring was continued until no excess tetrazotized DCB remained and then the temperature was increased to 40° C. The resulting pigment slurry was stirred an additional 30 minutes, filtered, washed and dried in an oven at 75° C., to afford 69.5 parts of an improved Pigment Yellow 12 composition.

EXAMPLE III

The procedure of Example II was repeated using 20.6 parts of Agent B in place of Agent A. An improved Pigment Yellow 12 composition (yield: 69.0 parts) similar to that of Example II was obtained.

EXAMPLE IV

This example illustrates the typical preparation of an amine-treated pigment in accordance with the prior art.

Tetrazotized DCB was prepared as in Example I. A fine suspension of coupler was prepared by charging 31.9 parts acetoacetanilide to 400 parts water and 33.6 parts of 50% sodium hydroxide; the mixture was stirred until all solids were dissolved. The temperature of the resulting solution was adjusted to 0°-5° C. with the addition of ice and thereafter the coupler was precipitated by the slow addition of 36.2 parts of 70% acetic acid. Stirring was maintained throughout coupler preparation and the coupling reaction.

Coupling was then carried out by adding the solution of tetrazotized DCB to the fine suspension of coupler over a period of 30 to 40 minutes. While the coupling reaction was taking place, an emulsion was prepared by adding 8.1 parts of N-tallow alkyldipropylene triamine (a typical amine for treating pigments in accordance with the prior art) into an agitated solution of 4.5 parts 70% acetic acid in 39.2 parts water. At the completion of the coupling reaction (no excess tetrazo remained), the emulsion was added to the resulting pigment slurry over a period of 15 minutes. The slurry was heated to a temperature of 95° C. and the pH was then adjusted from 4.0-4.2 to 11.0-11.2 with approximately 19.0 parts of 50% sodium hydroxide. Stirring at 95° C. was continued for 15 minutes and the slurry was then diluted with cold water, filtered, washed and dried in an oven at 110° C., to afford 61.4 parts of an amine-modified Pigment Yellow 12 composition which is representative of the amine-treated pigments of the prior art.

EXAMPLE V

Publication gravure printing inks were prepared from the pigment compositions of Examples III and IV. Thus, 25 parts of each pigment composition were mixed with 75 parts of a commercial publication gravure ink vehicle comprised of 56.4 parts of toluene and 18.6 parts of zinc-calcium resinate, and milled for 30 minutes using 300 parts of ⅛ inch stainless steel shot as the grinding media. The viscosity of the mill base prepared from the pigment composition of Example II (prepared from the substituted acetoacetanilides of the present invention) was approximately one-fourth of that of the mill base prepared from the pigment composition of Example IV (the prior art pigment composition).

Base inks containing 5 wt. % pigment were then prepared by dilution of the mill bases with 63.8 parts of vehicle and 20.2 parts of toluene. One-half of each base ink was sealed and stored at 50° C. for 72 hours in order to asses storage stability. The other half of each base ink was immediately adjusted to print viscosity (18±2 seconds through a no. 2 shell cup) with the addition of toluene and printed to assess coloristic properties. The results indicated that the two inks required the same amount of diluent to achieve the desired print viscosity and produced prints with comparable strength, shade, transparency, gloss and hold-out. Thus, it appears that, apart from storage stability, the ink prepared from the pigment composition of Example III exhibited comparable application properties as compared to the conventional ink prepared from the prior art pigment composition of Example IV.

The base inks which were maintained at 50° C. for 72 hours were cooled to ambient temperature and then converted to finished inks with addition of toluene as described above. Evaluation of the inks indicated that the ink prepared from the prior art pigment composition of Example IV as 40% weaker, more opaque, flatter and greener in shade than that prepared from the pigment composition of Example III. Furthermore, the ink based prepared from the prior art pigment composition of Example IV required approximately 50% more diluent to achieve print viscosity.

As may be seen from the examples set forth above, the diarylide pigments modified with the substituted acetoacetanilides of the present invention can be conveniently prepared and exhibit significantly improved properties, particularly in providing lower rheology mill bases and finished publication gravure printing inks possessing dramatically improved storage stability.

What is claimed is:

1. A poly (alkylene oxide) substituted acetoacetanilide having the general formula:

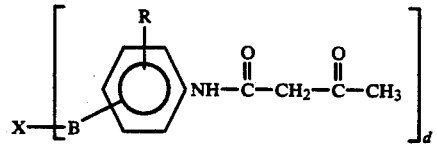

wherein B comprises a divalent bridging moiety selected from the group consisting of C$_1$-C$_6$ alkylene, —NHSO$_2$—, —O—, —CO—, —COO—, and —N-CHO—; X comprises a poly (alkylene oxide) having a number average molecular weight of about 200 to 10,000; R comprises 0 to 4 moieties independently selected from the group consisting of C$_1$-C$_4$ alkyl, C$_1$-C$_4$ alkoxy, and halogen; and d is an integer of 1 to 3.

2. The acetoacetanilide of claim 1 wherein d is 1.

3. The acetoacetanilide of claim 2 wherein B is —N-CHO—.

4. The acetoacetanilide of claim 2 wherein X has a number average molecular weight of 1,000 to 3,000.

5. The acetoacetanilide of claim 2 wherein R is 0.

6. The acetoacetanilide of claim 2 wherein X comprises an ethylene oxide/propylene oxide copolymer.
7. The acetoacetanilide of claim 6 wherein the copolymer has the general formula:
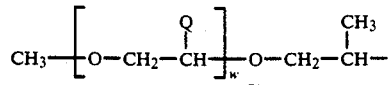
wherein Q is H or $CH_3$ and w is an integer of about 4 to 200.
8. The acetoacetanilide of claim 7 wherein w is an integer of 20 to 65.
* * * * *